United States Patent
Cheung et al.

(10) Patent No.: US 7,199,560 B2
(45) Date of Patent: Apr. 3, 2007

(54) SWITCH-MODE POWER SUPPLY VOLTAGE REGULATOR AND METHODOLOGY

(75) Inventors: Eugene Lau Cheung, Fremont, CA (US); Talbott Mead Houk, Monte Sereno, CA (US)

(73) Assignee: Linear Technology Corporation, Milpitas, CA (US)

(*) Notice: Subject to any disclaimer, the term of this patent is extended or adjusted under 35 U.S.C. 154(b) by 335 days.

(21) Appl. No.: 10/981,488

(22) Filed: Nov. 5, 2004

(65) Prior Publication Data
US 2006/0097705 A1   May 11, 2006

(51) Int. Cl.
*G05F 1/613* (2006.01)

(52) U.S. Cl. .............. 323/222; 323/285; 323/351

(58) Field of Classification Search ............ 323/222, 323/282, 283, 285, 351
See application file for complete search history.

(56) References Cited

U.S. PATENT DOCUMENTS

| | | | |
|---|---|---|---|
| 4,803,378 A * | 2/1989 | Richardson ............. 307/108 |
| 5,359,279 A * | 10/1994 | Gidon et al. ............ 323/282 |
| 5,479,090 A * | 12/1995 | Schultz ................. 323/284 |
| 5,481,178 A | 1/1996 | Wilcox et al. |
| 5,705,919 A * | 1/1998 | Wilcox ................. 323/282 |
| 5,731,694 A | 3/1998 | Wilcox et al. |
| 5,847,554 A * | 12/1998 | Wilcox et al. ......... 323/282 |
| 5,929,620 A * | 7/1999 | Dobkin et al. ......... 323/288 |
| 5,994,885 A * | 11/1999 | Wilcox et al. ......... 323/285 |
| 6,127,815 A | 10/2000 | Wilcox |
| 6,304,066 B1 | 10/2001 | Wilcox et al. |
| 6,366,066 B1 * | 4/2002 | Wilcox ................. 323/282 |
| 6,580,258 B2 | 6/2003 | Wilcox et al. |
| 7,106,037 B2 * | 9/2006 | Ohtake et al. ......... 323/285 |

* cited by examiner

*Primary Examiner*—Jeffrey Sterrett
(74) *Attorney, Agent, or Firm*—McDermott Will & Emery LLP

(57) ABSTRACT

Pulse width modulation of the connection of a load output terminal to a power supply terminal is effected. In response to a first level of the pulse width modulated signal, the load is disconnected from the power supply terminal, steady-state load voltage is preserved on a capacitor connected between a load output terminal and a power supply terminal, and steady-state load current information is held on a capacitor within the feedback loop. In response to a second level of the pulse width modulated signal, the load is reconnected to the power supply terminal, and load voltage and current instantaneously resume at their correct steady-state values.

25 Claims, 3 Drawing Sheets

SWITCH-MODE POWER SUPPLY VOLTAGE REGULATOR AND METHODOLOGY

TECHNICAL FIELD

The present disclosure relates to pulse-width-modulation control for a switch-mode power supply voltage regulator, more particularly to improving operation at frequencies above the power supply control loop's crossover frequency.

BACKGROUND

A conventional switch-mode power supply is illustrated in the block diagram of FIG. 1. The voltage applied to load 10 at the $V_{OUT}$ node is regulated by the power supply circuit. The load is connected in series with a signal responsive switch 12, the series circuit connected across output capacitor 14. The capacitor and switch are both directly connected to the ground power supply terminal. The other power supply terminal, $V_{IN}$, is connected to the $V_{OUT}$ node through inductance 16 and diode 18. $V_{SW}$, the junction of the inductance and diode, is connected through signal responsive switch 20 to ground via current-sense resistor 13. Signal responsive switches such as 12 and 20 are typically electronic switches having gate activation. Signal responsive switch 12 is operable in response to a pulse width modulated signal PWM. Signal responsive switch 20 is operable in response to a feedback control circuit that comprises error amplifier 22, capacitor 24, oscillator 11, comparator 15, and latch 28. A reference voltage $V_{REF}$ is applied to a first input of the error amplifier 22. The voltage at the $V_{OUT}$ node, or a fraction thereof, is applied to the second input of the error amplifier. Capacitor 24 is charged and discharged by the output of the error amplifier.

FIG. 2 illustrates time waveforms of various circuit parameters during normal operation of the conventional circuit of FIG. 1. Waveform (A) represents pulse width modulation signal PWM. Waveform (B) represents a voltage signal applied to the $V_{GATE}$ of signal responsive switch 20. Voltage at the $V_{OUT}$ node is shown in waveform (C). Voltage $V_{ITH}$ at the output of error amplifier 22 is shown in waveform (D). In operation, at time t1, the PWM signal is high and switch 12 is closed so that the load is connected to ground. While in this condition, the switch 20 is switched at a peak current level, sensed as $V_{SENSE}=V_{ITH}$, that is required to maintain voltage $V_{OUT}$ at a level equal to $V_{REF}$. This circuit configuration functions in a well known manner as a current-mode voltage boost regulator, wherein $V_{OUT}$ is greater than $V_{IN}$, and the error amplifier output directly controls the peak switching/inductor current. The switching of $V_{GATE}$ is implemented by the S-R latch 28 in response to the rising edge of oscillator 11, which sets the latch, raising $V_{GATE}$ and closing switch 20. Switch 20 is opened when $V_{SENSE}$ crosses the level of voltage $V_{ITH}$ at capacitor 24, which crossing trips the output of comparator 15, resetting latch 28. Switch 20 is again closed at the next rising edge provided by oscillator 11. When switch 20 is in the closed state and switch 12 is in the closed state, charge on capacitor 14 discharges through the load 10. When switch 20 is in the open state and switch 12 is in the closed state, charge is applied to capacitor 14 from the power supply via diode 18. Voltage $V_{OUT}$ and voltage $V_{ITH}$ are relatively constant in steady-state operation, as shown by waveforms (C) and (D), respectively.

At time t2 the PWM signal goes low to set switch 12 to an open state, causing instantaneous disconnection of the output load from ground. When the load current is interrupted, a $V_{OUT}$ overvoltage condition occurs as the supply continues to deliver excess output current through the inductance 16 to the output capacitor 14 during the duty cycle switching of switch 20. The $V_{OUT}$ overvoltage condition, as shown in waveform (C), continues until the feedback control loop has time to correct for the error. As excess output current is delivered to the output capacitor 14, $V_{OUT}$ increases. The increased feedback voltage ($V_{REF}-V_{OUT}$), applied to the error amplifier, decreases the charge applied to capacitor 24, as indicated by current waveform (D), thereby resulting in a decreased peak switching current at which switch 20 opens. The current $I_L$ is shown in waveform (E). The changes of voltages $V_{OUT}$ and $V_{ITH}$ decrease toward a steady-state value as correction is made by the circuit for the transient effects of the PWM signal change. The time required to reach a new steady-state value is related to the closed-loop bandwidth and crossover frequency for the control loop.

At time t3 the PWM signal again goes high and the load is reconnected to ground through now-closed switch 12. At that time the periodic signal $V_{GATE}$ applied to switch 20 had been adjusted to supply the appropriate charge to capacitor 14 with the load disconnected. A $V_{OUT}$ undervoltage condition occurs upon reconnection of the load as it will discharge capacitor 14 because the peak current supplied by switch 20 at that time, as shown in waveform (E), is not appropriate to the changed condition. The undervoltage condition continues until the feedback control loop can correct and recharge the capacitor. The negative feedback voltage is acted upon by the feedback control loop to adjust the current limit imposed on switch 20 such that the charge applied to capacitor 14 is increased. Voltages $V_{OUT}$ and $V_{ITH}$ increase toward their appropriate steady-state values as correction is made by the circuit for the transient effects of the PWM signal change.

The magnitude and time extents of the overvoltage and undervoltage conditions depend on control loop parameters, load conditions, and PWM switching frequency. Effective PWM control of a load is thus fundamentally limited to frequencies substantially below that at which the control loop can correct perturbations. The need thus exists for a pulse width modulated control arrangement for a switch-mode power supply that is operable at high frequencies.

SUMMARY OF THE DISCLOSURE

The subject matter described herein fulfills the above-described needs of the prior art at least in part by providing a method for effecting pulse width modulation of the connection of a load to a power supply terminal in response to a first level of a pulse width modulated signal, which disconnects the load from the power supply terminal in response to a second level of the pulse width modulated signal, and charges a capacitor connected between the load output terminal and the power supply terminal at a peak current level controlled in response to the voltage at the output terminal via a feedback control loop only when the pulse width modulated signal is at the first level. Charging of the capacitor is inhibited when the pulse width modulated signal is at a second level.

In accordance with an aspect of the disclosure, a first signal responsive switch is connected in series with the load between a voltage output node and the power supply terminal, the switch operative between an open and closed state in response to a pulse width modulation signal. A second signal responsive switch is connected in series with an impedance and a power supply terminal to draw current from the power supply through the impedance when the second signal responsive switch is in a closed state. A feedback circuit is connected between a load circuit terminal and the second signal responsive switch for controlling the state of the second signal responsive switch. A voltage representative of a load parameter is subtracted from a reference voltage by a error amplifier to obtain an error current applied to a storage capacitor. The storage capacitor voltage is converted to a peak current limit imposed on the second signal responsive switch. The load parameter may be load voltage taken at the load output terminal, or load current derived from a resistance connected in series with the load.

The feedback circuit is responsive to the pulse width modulation signal so as to be inactive when the first signal responsive switch is in the open state. A third signal responsive switch is connected in series with the error amplifier and also responsive to the pulse width modulation signal so as to be in the same state as the first signal responsive switch. A logic element having a first input terminal connected to the feedback circuit and a second input terminal connected to the pulse width modulated signal, and an output terminal connected to the second signal responsive switch ensure that the second signal responsive switch is in an open state when the other signal responsive switches are in an open state. Peak switch current information proportional to load current state is thus stored by the storage capacitor when the load is disconnected from the power supply terminal.

Additional advantages will become readily apparent to those skilled in this art from the following detailed description, wherein only the preferred embodiments are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Implementations of the present invention are illustrated by way of example, and not by way of limitation, in the figures of the accompanying drawings and in which like reference numerals refer to similar elements.

DETAILED DESCRIPTION

Figure 1:
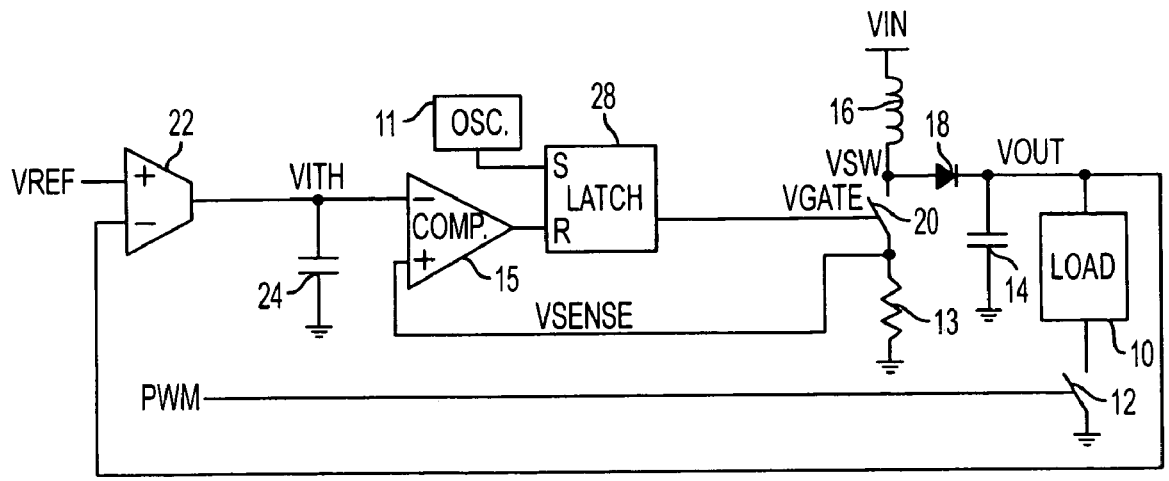
FIG. 1 is a block diagram of a conventional switch-mode power supply.
Figure 2:
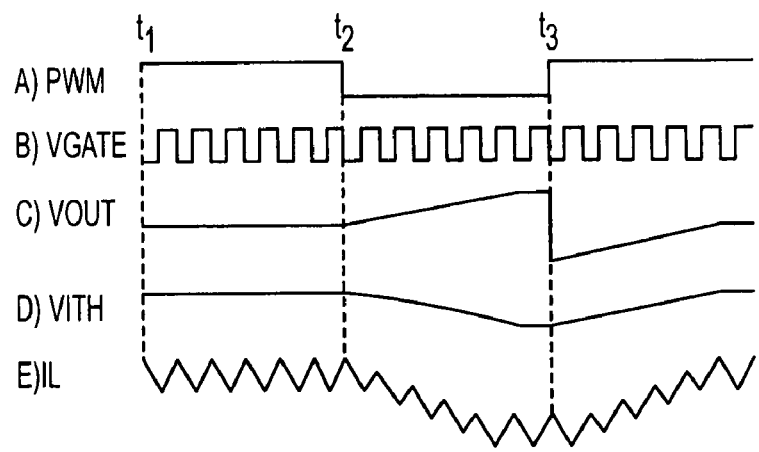
FIG. 2 is illustrative of time waveforms for the circuit of FIG. 1.
Figure 3:
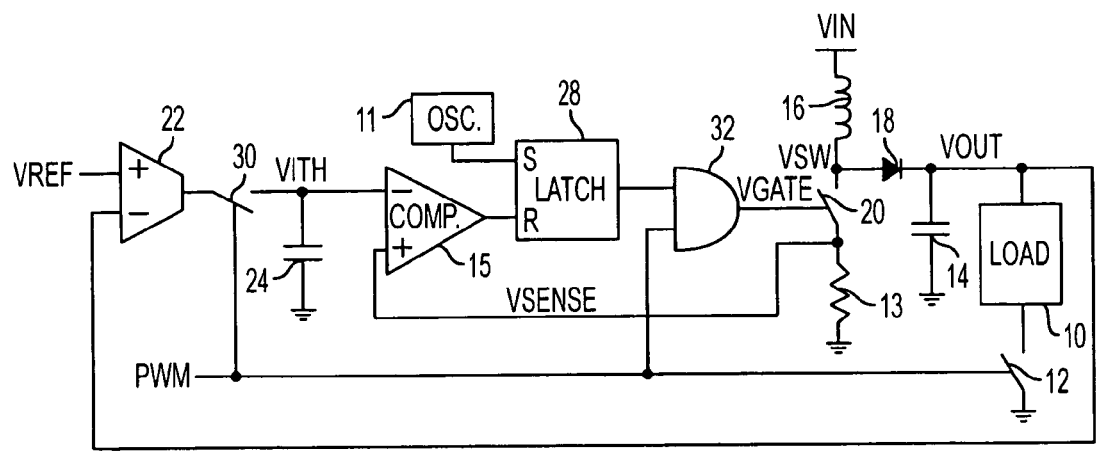
FIG. 3 is a block diagram of a switch-mode power supply in accordance with the present invention.

The regulator circuit depicted in FIG. 3 contains some of the same elements as shown in FIG. 1 that are identified by the same reference numerals. As in FIG. 1, the voltage applied to load 10 at the $V_{OUT}$ node is regulated by the power supply circuit. The load is connected in series with a signal responsive switch 12, the series circuit connected across output capacitor 14. The capacitor and switch are both directly connected to the ground power supply terminal. The other power supply terminal, $V_{IN}$, is connected to the $V_{OUT}$ node through inductance 16 and diode 18. The junction of the inductance and diode, $V_{SW}$, is connected to ground through the series combination of signal responsive switch 20 and current-sense resistor 13.

Signal responsive switch 12 is operable in response to a pulse width modulated signal PWM. Signal responsive switch 20 is operable in response to a feedback control circuit that comprises error amplifier 22, third signal responsive switch 30, capacitor 24, oscillator 11, comparator 15, latch 28, and AND gate 32. The pulse width modulation signal PWM is coupled to switch 30 and to one input of AND gate 32. The other input of AND gate 32 is coupled to latch 28 for receipt of the feedback loop switching signal output. The output of AND gate 32, $V_{GATE}$, is applied to the gate of the switch 20. Reference voltage $V_{REF}$ is applied to a first input of the error amplifier. The voltage at the $V_{OUT}$ node, or a fraction thereof, is applied to the second input of the error amplifier.

Figure 4:
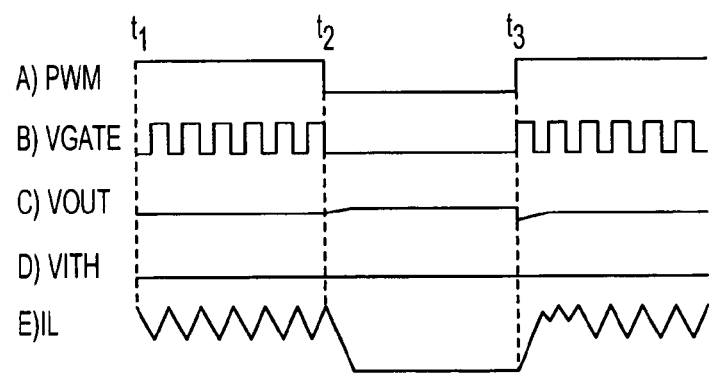
FIG. 4 is illustrative of time waveforms for the circuit of FIG. 3.

Operation of the circuit of FIG. 3 is as follows, with reference to the waveforms of FIG. 4. At time t1, the PWM signal, shown in waveform (A), is high. The high signal, applied to the gates of switches 12 and 30, drives these switches to a closed state. The high signal is also received at one input of the AND gate 32. During this time, switch 12 is closed so that the load is connected to ground. As switch 30 is closed and a high signal is applied to an input of the AND gate 32, the switch 20 is switched by the feedback loop at a peak current that is required to maintain voltage $V_{OUT}$ at a level equal to $V_{REF}$. The output signal $V_{GATE}$ of AND gate 32 is shown in waveform (B). Voltages $V_{OUT}$ and $V_{ITH}$ are relatively constant, as shown by waveforms (C) and (D), respectively.

At time t2, the PWM signal goes low and is effective to drive switches 12 and 30 to an open state and to prevent a high output signal from AND gate 32. Thus, during the low signal period between t1 and t2 switch 20 is maintained in an open state and no periodic switching takes place. As switch 20 and switch 12 remain open, capacitor 14 effectively holds the load voltage value constant. As the switch 30 disconnects the output of the error amplifier from capacitor 24, the voltage at that capacitor remains unchanged, and thus effectively holds $V_{ITH}$, the desired steady-state peak current value, constant. The load current information at time t2 is thus stored until the PWM signal goes high at time t3, and there is no need for the charge current to capacitor 24 to build up when switch 12 returns to a closed state. During that time period, voltage $V_{OUT}$ and current $V_{ITH}$ remain relatively constant at their earlier levels. No over or under voltage condition exists that will be in need of correction.

At time t3 the PWM signal again goes high to again drive switches 12 and 30 to a closed state and AND gate 32 to a mode in which the feedback duty cycle signal will be applied to the $V_{GATE}$ of switch 20. As voltages $V_{OUT}$ and $V_{ITH}$ are already at their steady-state levels, the circuit functions without the need to correct for transients caused by the change in level of the PWM signal. Voltages $V_{OUT}$ and $V_{ITH}$ remain relatively constant at their same levels while periodic switching of switch 20 again takes place.

Figure 5:
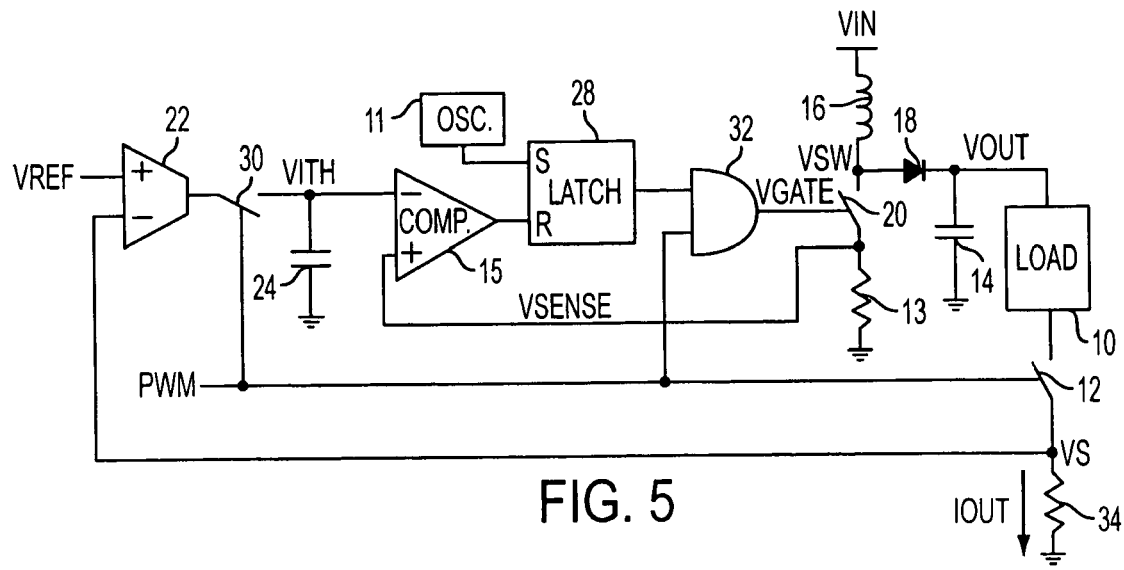
FIG. 5 is a block diagram of a variation of the switch-mode power supply of FIG. 3.

FIG. 5 is a block diagram of a variation of the switch-mode power supply of FIG. 3 and differs therefrom in the following manner. Connected between switch 12 and ground power supply terminal is resistor 34. When switch 12 is in the closed state the voltage at $V_S$ is a function of the current drawn by the load. That voltage is applied to the one input of the error amplifier to be subtracted from the voltage $V_{REF}$ applied at the other input terminal. Thus, the circuit of FIG. 5 provides periodic switching of switch 20 as a function of load current $I_{OUT}$. In the operation of the circuit of FIG. 5, switches 12, 20 and 30 are responsive to changes in the level of the PWM signal in the same manner as described with respect to the operation of the FIG. 3 circuit. The waveforms shown in FIG. 4 also depict the operation of the FIG. 5 arrangement. This arrangement can be used to advantage with loads that are non-linear in nature.

Figure 6:
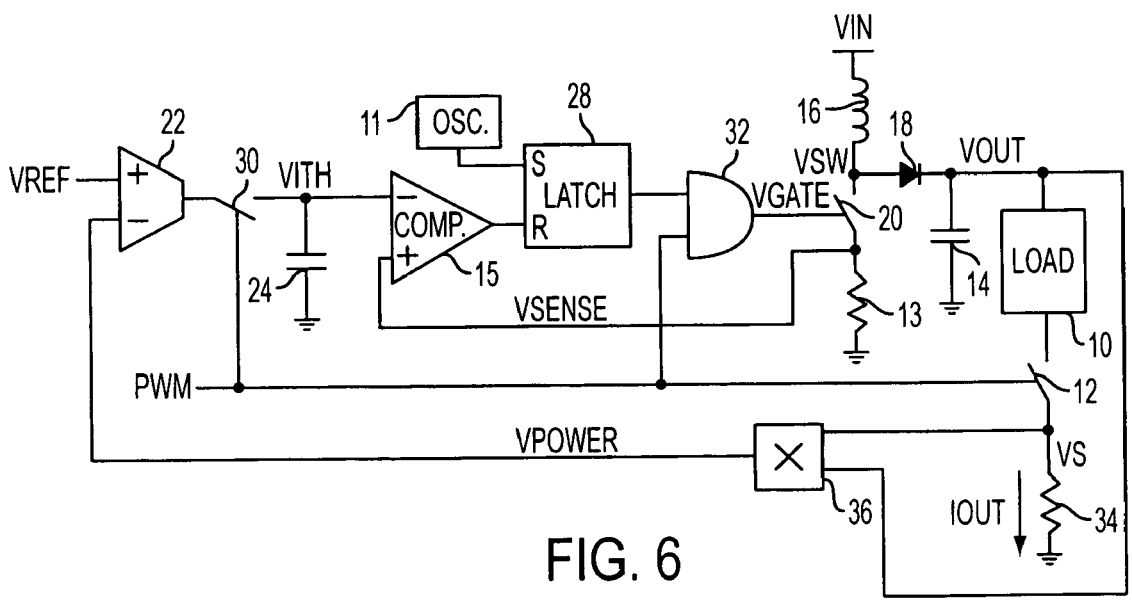
FIG. 6 is a block diagram of a variation of the switch-mode power supplies of FIGS. 3 and 5.

FIG. 6 is a block diagram of a variation of the switch-mode power supplies of FIGS. 3 and 5. Multiplier 36 has a first input connected to receive the voltage at $V_S$ and a second input to receive the output voltage $V_{OUT}$. The output $V_{POWER}$ of the multiplier is applied to the negative input of error amplifier 22. $V_{POWER}$ is the scaled product of load voltage and load current and is subtracted from the voltage $V_{REF}$ applied at the other input terminal of the error amplifier. Thus, the circuit of FIG. 6 provides periodic switching of switch 20 as a function of $V_{POWER}$, a voltage proportional to load power. In the operation of the circuit of FIG. 6, switches 12, 20 and 30 are responsive to changes in the level of the PWM signal in the same manner as described with respect to the operation of the circuits of FIG. 3 and FIG. 5. The waveforms shown in FIG. 4 also depict the operation of the FIG. 6 arrangement. The power supply of FIG. 6 can be used to advantage with nonlinear loads when power is the parameter of interest.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example the concepts expressed herein with respect to the illustrated boost regulator circuits are equally applicable to other well known regulators including buck, buck/boost, flyback, forward, inverting, SEPIC, and zeta configurations.

What is claimed:

1. A regulator comprising:
  a first circuit for periodically coupling and decoupling a load with respect to a terminal in response to an input signal;
  a regulating circuit for regulating a load parameter when the input signal is at a first level and the load is coupled to the terminal; and
  a second circuit for rendering the regulating circuit inactive when the input signal is at a second level and the load is decoupled from the terminal such that internal voltages of the regulating circuit are substantially unchanged.

2. A regulator as recited in claim 1, wherein the input signal is a pulse width modulated signal.

3. A regulator as recited in claim 1, wherein the regulating circuit comprises an input terminal for receiving a voltage related to the voltage of the load.

4. A regulator as recited in claim 1, wherein the regulating circuit comprises an input terminal for receiving a voltage related to the current of the load.

5. A regulator as recited in claim 1, wherein the regulating circuit is a boost regulator.

6. A regulator as recited in claim 1, wherein the load parameter is voltage.

7. A regulator as recited in claim 1, wherein the load parameter is current.

8. A regulator as recited in claim 1, wherein the load parameter is power.

9. A method for controlling a regulator, the method comprising the steps of:
  connecting a load to a terminal when a pulse signal is at a first level;
  regulating a load parameter when the pulse signal is at the first level;
  disconnecting the load from the terminal when the pulse signal is at a second level;
  rendering regulation of the load parameter inactive when the pulse signal is at the second level; and
  maintaining internal voltages of the switching regulator substantially unchanged when the pulse signal is at the second level.

10. A method as recited in claim 9, wherein the step of regulating comprises receiving a voltage related to the voltage of the load.

11. A method as recited in claim 9, wherein the step of regulating comprises receiving a voltage related to the load current.

12. A circuit comprising:
  a first signal responsive switch coupled between a load and a power supply terminal, the switch operative between an open and closed state in response to a control signal;
  a second signal responsive switch coupled in series with an impedance and the power supply terminal, wherein current is drawn from the power supply through the impedance when the second signal responsive switch is in a closed state; and
  a regulator circuit coupled between a load circuit terminal and the second signal responsive switch for controlling the state of the second signal responsive switch, the regulator circuit responsive to the control signal to be rendered inactive when the first signal responsive switch is in the open state.

13. A circuit as recited in claim 12, wherein the control signal is a pulse width modulation signal.

14. A circuit as recited in claim 13, wherein the regulator circuit comprises:
  a differential amplifier having a first input terminal coupled to the load circuit terminal, a second input terminal coupled to a voltage reference, and an output terminal; and
  a third signal responsive switch coupled in series with the differential amplifier, the third signal responsive switch responsive to the pulse width modulation signal to attain an open state when the load is decoupled from the power supply terminal.

15. A circuit as recited in claim 14, wherein the regulator circuit further comprises a logic element having a first input terminal coupled to the third signal responsive switch and a second input terminal coupled to the pulse width modulated signal, and an output terminal coupled to the second signal responsive switch to provide a signal thereto.

16. A circuit as recited in claim 15, further comprising a converter circuit coupled between the third signal responsive switch and the first input terminal of the logic element for converting a voltage to periodic switching.

17. A circuit as recited in claim 12, wherein the load circuit terminal is the voltage output node.

18. A circuit as recited in claim 12, further comprising a resistance coupled between the first switch and the power supply terminal; and
  the load circuit terminal is a connection point between the first switch and the power supply terminal.

19. A method for regulating a voltage applied to a load terminal, the method comprising the steps of:
- connecting the load to a power supply terminal in response to a first level of a pulse width modulated signal;
- disconnecting the load from the power supply terminal in response to a second level of the pulse width modulated signal;
- conducting current through an impedance and the power supply terminal at a duty cycle rate responsive to the voltage at a load terminal when the pulse width modulated signal is at the first level; and
- inhibiting the conducting step when the pulse width modulated signal is at a second level.

20. A method as recited in claim 19, wherein the step of conducting current comprises controlling states of a signal responsive switch coupled in series with the power supply terminal.

21. A method as recited in claim 20, wherein the step of inhibiting comprises maintaining the signal responsive switch in an open state.

22. A method as recited in claim 20, wherein the step of controlling comprises subtracting a voltage representative of a load parameter from a reference voltage to obtain a error voltage.

23. A method as recited in claim 22, wherein the representative voltage is related to the load voltage.

24. A method as recited in claim 22, wherein the load parameter is load current and the representative voltage is derived from a resistance in series with the load.

25. A method as recited in claim 20, further comprising storing load current information when the load is decoupled from the power supply terminal.

* * * * *